US010362535B2

(12) United States Patent
Patel et al.

(10) Patent No.: US 10,362,535 B2
(45) Date of Patent: Jul. 23, 2019

(54) SYSTEM AND METHOD FOR PUSH-TO-TALK (PTT) KEY ONE-TOUCH CALLING

(71) Applicant: Kodiak Networks Inc., Plano, TX (US)

(72) Inventors: Krishnakant M. Patel, Richardson, TX (US); Ravi Ayyasamy, Plano, TX (US); Anand Narayanan, Plano, TX (US); Brahmananda R. Vempati, Dallas, TX (US)

(73) Assignee: KODIAK NETWORKS, INC., Plano, TX (US)

( * ) Notice: Subject to any disclaimer, the term of this patent is extended or adjusted under 35 U.S.C. 154(b) by 111 days.

(21) Appl. No.: 15/493,789

(22) Filed: Apr. 21, 2017

(65) Prior Publication Data
US 2017/0311256 A1 Oct. 26, 2017

Related U.S. Application Data

(60) Provisional application No. 62/326,570, filed on Apr. 22, 2016.

(51) Int. Cl.
*G06F 15/173* (2006.01)
*H04W 52/02* (2009.01)
(Continued)

(52) U.S. Cl.
CPC ......... *H04W 52/0216* (2013.01); *H04L 29/00* (2013.01); *H04W 4/10* (2013.01);
(Continued)

(58) Field of Classification Search
CPC ......... H04W 52/0229; H04W 52/0258; H04W 76/45; H04L 29/00; H04L 67/125; G06F 1/2247; G06F 1/2258; G06F 17/2258
(Continued)

(56) References Cited

U.S. PATENT DOCUMENTS 3,912,874 A 10/1975 Botterell et al.
4,796,293 A 1/1989 Blinken et al.
(Continued)

FOREIGN PATENT DOCUMENTS

GB 2338150 A 3/1998
JP 200392776 A 10/2004
(Continued)

OTHER PUBLICATIONS

ETSI: "ETSI TS 100 812-2 v2.3.1 Terrestrial Trunked Radio (TETRA) Subscriber Identity Module to Mobile Equipment (SIM-ME) interface; Part 2: Universal Integrated Circuit Card (UfCC) Characteristics of the TSIM application", ETSI Technical Specification, Oct. 2003, all pages.
(Continued)

*Primary Examiner* — Kyung H Shin

(57) ABSTRACT

A system and method for push-to-talk (PTT) key one-touch calling is provided. In an embodiment, a client device accesses a discontinuous reception (DRX) mode policy. The DRX mode policy is in accordance with push-to-talk (PTT) usage patterns of at least the client device. The client device selects a DRX cycle time based on the DRX mode policy. The client device applies the DRX cycle time to a cellular network interface of the client device.

24 Claims, 7 Drawing Sheets

(51) Int. Cl.
*H04W 4/10* (2009.01)
*H04L 29/00* (2006.01)
*H04W 76/28* (2018.01)
*H04L 12/24* (2006.01)
*H04L 29/06* (2006.01)

(52) U.S. Cl.
CPC ... *H04W 52/0219* (2013.01); *H04W 52/0229* (2013.01); *H04W 52/0258* (2013.01); *H04W 76/28* (2018.02); *H04L 41/0893* (2013.01); *H04L 65/4061* (2013.01); *Y02D 70/1262* (2018.01); *Y02D 70/1264* (2018.01); *Y02D 70/142* (2018.01); *Y02D 70/144* (2018.01); *Y02D 70/166* (2018.01); *Y02D 70/24* (2018.01); *Y02D 70/26* (2018.01)

(58) Field of Classification Search
USPC .................................................. 709/224
See application file for complete search history.

(56) References Cited

U.S. PATENT DOCUMENTS

| | | | |
|---|---|---|---|
| 5,353,328 A | 10/1994 | Jokimies | |
| 5,442,809 A | 8/1995 | Diaz et al. | |
| 5,546,449 A | 8/1996 | Hogan et al. | |
| 5,711,011 A | 1/1998 | Urs et al. | |
| 5,752,196 A | 5/1998 | Ahvenainen et al. | |
| 5,987,318 A | 11/1999 | Alperovich et al. | |
| 5,987,331 A | 11/1999 | Grube et al. | |
| 6,011,976 A | 1/2000 | Michaels et al. | |
| 6,021,326 A | 2/2000 | Nguyen | |
| 6,138,011 A | 10/2000 | Sanders, III et al. | |
| 6,141,556 A | 10/2000 | Dougherty et al. | |
| 6,192,119 B1 | 2/2001 | Wilson | |
| 6,304,558 B1 | 10/2001 | Mysore | |
| 6,397,054 B1 | 5/2002 | Hoirup et al. | |
| 6,405,030 B1 | 6/2002 | Suprunov | |
| 6,411,815 B1 | 6/2002 | Balasuriya | |
| 6,473,501 B1 | 10/2002 | Paulsrud | |
| 6,477,366 B1 | 11/2002 | Valentine et al. | |
| 6,477,387 B1 | 11/2002 | Jackson et al. | |
| 6,549,773 B1 | 4/2003 | Linden et al. | |
| 6,577,874 B1 | 6/2003 | Dailey | |
| 6,606,305 B1 | 8/2003 | Boyle et al. | |
| 6,628,937 B1 | 9/2003 | Salin | |
| 6,661,878 B1 | 12/2003 | Mirashrafi et al. | |
| 6,725,053 B2 | 4/2004 | Rosen et al. | |
| 6,751,468 B1 | 6/2004 | Heubel et al. | |
| 6,801,762 B1 | 10/2004 | Huilgol | |
| 6,856,676 B1 | 2/2005 | Pirot et al. | |
| 6,865,398 B2 | 3/2005 | Mangal et al. | |
| 6,892,074 B2 | 5/2005 | Tarkiainen et al. | |
| 6,895,254 B2 | 5/2005 | Dorenbosch | |
| 6,898,436 B2 | 5/2005 | Crockett et al. | |
| 6,993,355 B1 | 1/2006 | Pershan | |
| 6,996,414 B2 | 2/2006 | Vishwanathan et al. | |
| 7,026,926 B1 | 4/2006 | Walker, III | |
| 7,043,266 B2 | 6/2006 | Chaturvedi et al. | |
| 7,082,316 B2 | 7/2006 | Elden et al. | |
| 7,085,364 B1 | 8/2006 | Ahmed et al. | |
| 7,099,291 B2 | 8/2006 | Harris et al. | |
| 7,123,905 B1 | 10/2006 | Allaway et al. | |
| 7,170,863 B1 | 1/2007 | Denman et al. | |
| 7,231,225 B2 | 6/2007 | Rao et al. | |
| 7,236,580 B1 | 6/2007 | Sarkar et al. | |
| 7,330,540 B2 | 2/2008 | Darby et al. | |
| 7,366,535 B2 | 4/2008 | Glass et al. | |
| 7,403,775 B2 | 7/2008 | Patel et al. | |
| 7,460,861 B2 | 12/2008 | Zabawskj | |
| 7,529,557 B2 | 5/2009 | Farrill | |
| 7,689,238 B2 | 3/2010 | Biswas et al. | |
| 7,738,861 B2 | 6/2010 | Fournier | |
| 7,738,892 B2 | 6/2010 | Ayyasamy et al. | |
| 7,738,896 B2 | 6/2010 | Patel et al. | |
| 7,751,348 B2 | 7/2010 | Shaffer et al. | |
| 7,764,950 B2 | 7/2010 | Patel et al. | |
| 7,787,896 B2 | 8/2010 | Kundu et al. | |
| 7,797,010 B1 | 9/2010 | Manroa et al. | |
| 7,813,722 B2 | 10/2010 | Patel et al. | |
| 7,853,279 B2 | 12/2010 | Patel et al. | |
| 8,036,692 B2 | 10/2011 | Ayyasamy et al. | |
| 8,244,252 B2 | 8/2012 | Descombes | |
| 8,369,829 B2 | 2/2013 | Nagubhai et al. | |
| 8,478,261 B2 | 7/2013 | Vempati et al. | |
| 8,498,660 B2 | 7/2013 | Lawler et al. | |
| 8,670,760 B2 | 3/2014 | Lawler et al. | |
| 8,676,189 B2 | 3/2014 | Lawler et al. | |
| 2001/0005372 A1 | 6/2001 | Cave et al. | |
| 2002/0009990 A1 | 1/2002 | Kleier et al. | |
| 2002/0024943 A1 | 2/2002 | Karaul et al. | |
| 2002/0077136 A1 | 6/2002 | Maggenti et al. | |
| 2002/0086659 A1 | 7/2002 | Lauper | |
| 2002/0086676 A1 | 7/2002 | Hendrey et al. | |
| 2002/0102989 A1 | 8/2002 | Calvert et al. | |
| 2002/0187750 A1 | 12/2002 | Majumdar | |
| 2002/0196781 A1 | 12/2002 | Salovuori | |
| 2003/0009463 A1 | 1/2003 | Gallant | |
| 2003/0016632 A1 | 1/2003 | Refai et al. | |
| 2003/0017836 A1 | 1/2003 | Vishwanathan et al. | |
| 2003/0078064 A1 | 4/2003 | Chan | |
| 2003/0119540 A1 | 6/2003 | Mathis | |
| 2003/0148779 A1 | 8/2003 | Aravamudan et al. | |
| 2003/0149774 A1 | 8/2003 | McConnell et al. | |
| 2003/0153343 A1 | 8/2003 | Crockett et al. | |
| 2003/0190888 A1 | 10/2003 | Mangal et al. | |
| 2004/0032843 A1 | 2/2004 | Schaefer et al. | |
| 2004/0057449 A1 | 3/2004 | Black | |
| 2004/0067751 A1 | 4/2004 | Vandermeijden et al. | |
| 2004/0095954 A1 | 5/2004 | Varney et al. | |
| 2004/0121760 A1 | 6/2004 | Wetman et al. | |
| 2004/0127233 A1 | 7/2004 | Harris et al. | |
| 2004/0152441 A1 | 8/2004 | Wong | |
| 2004/0176100 A1 | 9/2004 | Florkey et al. | |
| 2004/0179531 A1 | 9/2004 | Bi et al. | |
| 2004/0196826 A1 | 10/2004 | Bao et al. | |
| 2004/0203793 A1 | 10/2004 | Dorenbosch | |
| 2004/0219941 A1 | 11/2004 | Haaramo et al. | |
| 2004/0224710 A1 | 11/2004 | Koskelainen et al. | |
| 2004/0228292 A1 | 11/2004 | Edwards | |
| 2004/0259580 A1 | 12/2004 | Florkey et al. | |
| 2005/0047362 A1 | 3/2005 | Harris et al. | |
| 2005/0101308 A1 | 5/2005 | Lee | |
| 2005/0111430 A1 | 5/2005 | Spear et al. | |
| 2005/0119012 A1 | 6/2005 | Merheb et al. | |
| 2005/0143135 A1 | 6/2005 | Brems et al. | |
| 2005/0164737 A1 | 7/2005 | Brown | |
| 2005/0189337 A1 | 9/2005 | Baune | |
| 2005/0192041 A1 | 9/2005 | Oxley et al. | |
| 2005/0202807 A1 | 9/2005 | Ayyasamy et al. | |
| 2005/0221819 A1 | 10/2005 | Patel et al. | |
| 2005/0232241 A1 | 10/2005 | Wu et al. | |
| 2005/0239485 A1 | 10/2005 | Kundu et al. | |
| 2005/0254464 A1 | 11/2005 | Patel et al. | |
| 2005/0261016 A1 | 11/2005 | Patel et al. | |
| 2006/0003740 A1 | 1/2006 | Munje | |
| 2006/0003751 A1 | 1/2006 | Vo | |
| 2006/0019654 A1 | 1/2006 | Farrill | |
| 2006/0029189 A1 | 2/2006 | Patel et al. | |
| 2006/0030347 A1 | 2/2006 | Biswas | |
| 2006/0056361 A1 | 3/2006 | Jiang et al. | |
| 2006/0067499 A1 | 3/2006 | Oliveira et al. | |
| 2006/0078064 A1 | 4/2006 | Schmidt et al. | |
| 2006/0094455 A1 | 5/2006 | Hannu et al. | |
| 2006/0116150 A1 | 6/2006 | Bhutiani | |
| 2006/0128411 A1 | 6/2006 | Turcanu | |
| 2006/0168513 A1* | 7/2006 | Coulson | G06F 17/2247 715/234 |
| 2006/0178138 A1 | 8/2006 | Ostroff et al. | |
| 2006/0189337 A1 | 8/2006 | Farrill et al. | |
| 2006/0198334 A1 | 9/2006 | Civanlar et al. | |
| 2006/0229090 A1 | 10/2006 | Ladue | |
| 2006/0234687 A1 | 10/2006 | Patel et al. | |
| 2007/0037562 A1 | 2/2007 | Smith-Kerker et al. | |

(56) References Cited

U.S. PATENT DOCUMENTS

| | | |
|---|---|---|
| 2007/0037597 A1 | 2/2007 | Biswas et al. |
| 2007/0037598 A1 | 2/2007 | Ayyasamy et al. |
| 2007/0042814 A1* | 2/2007 | Kakimoto ......... H04W 52/0258 455/574 |
| 2007/0049314 A1 | 3/2007 | Balachandran et al. |
| 2007/0070976 A1 | 3/2007 | Mussman et al. |
| 2007/0099609 A1 | 5/2007 | Cai |
| 2007/0133757 A1 | 6/2007 | Girouard et al. |
| 2007/0154005 A1 | 7/2007 | Daigle |
| 2007/0189487 A1 | 8/2007 | Sharland et al. |
| 2007/0190492 A1 | 8/2007 | Schmitt |
| 2007/0190984 A1 | 8/2007 | Ayyasamy et al. |
| 2007/0197234 A1 | 8/2007 | Gill et al. |
| 2007/0197248 A1 | 8/2007 | Reich et al. |
| 2007/0204039 A1 | 8/2007 | Inamdar |
| 2007/0217591 A1 | 9/2007 | Yasuma |
| 2007/0218885 A1 | 9/2007 | Pfleging et al. |
| 2007/0253347 A1 | 11/2007 | Patel et al. |
| 2007/0259673 A1 | 11/2007 | Willars et al. |
| 2007/0287474 A1 | 12/2007 | Jenkins et al. |
| 2008/0064364 A1 | 3/2008 | Patel et al. |
| 2008/0126230 A1 | 5/2008 | Bellora et al. |
| 2008/0147671 A1 | 6/2008 | Simon et al. |
| 2008/0299953 A1 | 12/2008 | Rao |
| 2009/0092116 A1 | 4/2009 | Jiang et al. |
| 2009/0119678 A1 | 5/2009 | Shih et al. |
| 2009/0149167 A1 | 6/2009 | Patel et al. |
| 2009/0209235 A1 | 8/2009 | Lawler et al. |
| 2009/0310503 A1 | 12/2009 | Tenny et al. |
| 2009/0325540 A1 | 12/2009 | Yach et al. |
| 2010/0035593 A1 | 2/2010 | Fanco et al. |
| 2010/0142414 A1 | 6/2010 | Patel et al. |
| 2010/0190492 A1 | 7/2010 | Jiang |
| 2010/0228854 A1* | 9/2010 | Morrison ................ H04L 29/00 709/224 |
| 2010/0234018 A1 | 9/2010 | Lawler et al. |
| 2011/0151917 A1 | 6/2011 | Mao et al. |
| 2011/0183659 A1 | 7/2011 | Ayyasamy et al. |
| 2011/0250923 A1 | 10/2011 | Miller et al. |
| 2012/0072751 A1* | 3/2012 | Das ................... H04W 52/0229 713/323 |
| 2013/0150026 A1 | 6/2013 | Ekici et al. |
| 2013/0155875 A1 | 6/2013 | Ayyasamy et al. |
| 2013/0196706 A1 | 8/2013 | Patel et al. |
| 2013/0308511 A1 | 11/2013 | Ljung |
| 2013/0337859 A1 | 12/2013 | Patel et al. |
| 2014/0010221 A1 | 1/2014 | Panian et al. |
| 2014/0148210 A1 | 5/2014 | Kundu et al. |
| 2014/0298041 A1 | 10/2014 | Consalus et al. |

FOREIGN PATENT DOCUMENTS

| | | |
|---|---|---|
| WO | 00069189 | 11/2000 |
| WO | 0079825 A1 | 12/2000 |
| WO | 0167674 A2 | 9/2001 |
| WO | 02101981 A1 | 12/2002 |
| WO | 03101007 A1 | 12/2003 |
| WO | 2005009006 A2 | 1/2005 |
| WO | 2005112494 A1 | 11/2005 |
| WO | 2005115032 A1 | 12/2005 |
| WO | 2005117474 A1 | 12/2005 |
| WO | 2006105287 A2 | 10/2006 |
| WO | 2010048217 A1 | 4/2010 |
| WO | 2010117815 A1 | 10/2010 |

OTHER PUBLICATIONS

Nokia: "What is TETRA? Why Nokia TETRA?", The Nokia TETRA Primer, 2002, pp. 1-29.

Skype: "Skype", Web Archive—Skype, May 22, 2004, pp. 1-2, May 22, 2004, pp. 1-2.

Trachwell: "TrackWell Software and Tetra Iceland deliver value added services to Tetra users", Trackwell.com, Oct. 2002, pp. 1-1.

\* cited by examiner

```
<?xml version="1.0" encoding="UTF-8" ?>
<pocdefaults id="1">
    <start-time>08:00:00 GMT</start-time>
    <duration>30</duration>
    <category>1</duration>

<start-time>10:00:00 GMT</start-time>
    <duration>30</duration>
    <category>2</duration>

<start-time>12:00:00 GMT</start-time>
    <duration>15</duration>
    <category>2</duration>

<start-time>17:30:00 GMT</start-time>
    <duration>20</duration>
    <category>1</duration>
</pocdefaults>
```

*Fig. 4A*

```
<?xml version="1.0" encoding="UTF-8" ?>
<pocdrxdoc>
    <start-time>2016-07-16T06:06:00.00Z </start-time>
    <duration>30</duration>
    <drx-slots>0,0,0,0,1,1,1,1,1,1,1,1,1,0,0,1,0,1,1,1,1,1,1,1,0,
     0,0,1,1,0,0,1,0,0,1,1,1,1,1,1,1,1,1,1,0,0,0</drx-slots>
    <expiry>24</expiry>
</pocdrxdoc>
```

*Fig. 4B*

SYSTEM AND METHOD FOR PUSH-TO-TALK (PTT) KEY ONE-TOUCH CALLING

CROSS-REFERENCE TO RELATED APPLICATIONS

This application claims the benefit of U.S. Provisional Application No. 62/326,570, filed on Apr. 22, 2016, which application is hereby incorporated herein by reference.

TECHNICAL FIELD

The present invention relates generally to communications over a telecommunications network, and in particular embodiments, to techniques and mechanisms for a system and method push-to-talk (PTT) key one-touch calling.

BACKGROUND

Push-to-talk (PTT) over cellular (PoC) platforms involve providing PoC functionality (e.g., call group management, call origination, call transmittal, talk-back call termination, floor management, filtering, etc.) through PTT clients on client devices. The PoC functions may be performed by one or more servers, and communications between the client devices and the servers may be performed over a telecommunications network (e.g., a carrier network).

Typically, PTT clients use at least two-touch dialing to initiate a call session. For example, the first touch may launch the PTT client to a particular screen (e.g., a PTT call history screen), and the second touch is used to initiate a call session with a particular contact or a most recent call entry. The two-touch dialing increases call setup time. For example, end-to-end call setup times using a two-touch dialing system with a same device type (e.g., same type of cellphone) as the originator and terminator of the call were as high as 3.9 seconds in some experiments.

Although predictive wakeup technology (e.g., described in U.S. Pat. No. 8,478,261, entitled "Predictive Wakeup for Push-To-Talk-Over-Cellular (PoC) Call Setup Optimizations," patented Jul. 2, 2013, which application is hereby incorporated by reference) can be used to reduce call setup times in two-touch dialing systems, the embodiments described below provide other mechanisms for decreasing call setup times. These embodiment mechanisms could be used in lieu of or in addition to predictive wakeup technology and/or other call setup time reducing technologies.

SUMMARY

In accordance with a preferred embodiment of the present invention, a method includes: accessing, by a client device, a discontinuous reception (DRX) mode policy, where the DRX mode policy is in accordance with push-to-talk (PTT) usage patterns of at least the client device; selecting, by the client device, a DRX cycle time based on the DRX mode policy; and applying, by the client device, the DRX cycle time to a cellular network interface of the client device.

In some embodiments, the method further includes: collecting, by the client device, PTT usage data for the client device, the PTT usage data including information about calls made and received by the client device; determining, by the client device, usage patterns according to the PTT usage data; and creating, by the client device, the DRX mode policy according to the usage patterns. In some embodiments, the mode policy is created in response to the PTT usage data indicating a recent call to a PTT group having a predefined attribute. In some embodiments, the predefined attribute is an indication that the PTT group is an emergency call group. In some embodiments, accessing the DRX mode policy includes: receiving, by a client device, the DRX mode policy from a server. In some embodiments, the method further includes: updating, by the client device, the DRX mode policy. In some embodiments, the DRX mode policy is updated by the client device at regular intervals. In some embodiments, the DRX mode policy is updated by the client device in response to the client device logging into a PTT network. In some embodiments, the applying the DRX cycle time to a cellular network interface of the client device includes: adjusting a radio interface layer (RIL) parameter of the cellular network interface.

In accordance with a preferred embodiment of the present invention, a method includes: collecting, by a push-to-talk (PTT) server, PTT usage data for a PTT client, the PTT usage data including information about calls made and received by the PTT client; determining, by the PTT server, usage patterns according to the PTT usage data; creating, by the PTT server, a discontinuous reception (DRX) mode policy according to the usage patterns; and transmitting, by the PTT server, the DRX mode policy to the PTT client.

In some embodiments, the determining the usage patterns includes: identifying, by the PTT server, the PTT usage data of the PTT client to be included in the determining the usage patterns; collecting, by the PTT server, the PTT usage data of the PTT client in a window of time; determining, by the PTT server, durations of DRX slots of the DRX mode policy according to the PTT usage data in the window of time; and predicting, by the PTT server, the usage patterns for each of the DRX slots. In some embodiments, the creating the DRX mode policy includes: creating, by the PTT server, the DRX mode policy based on the predicted usage patterns. In some embodiments, predicting the usage patterns for the DRX slots includes: performing a time series analysis with the PTT usage data for each of the DRX slots. In some embodiments, the method further includes: serializing, by the PTT server, the DRX mode policy to a serialized document. In some embodiments, the transmitting the DRX mode policy to the PTT client includes: transmitting, by the PTT server, the serialized document in a session initiation protocol (SIP) message to the PTT client. In some embodiments, the DRX mode policy indicates, for each of the DRX slots, DRX cycle times the PTT client should use. In some embodiments, the DRX mode policy indicates, for each of the DRX slots, whether the PTT client should use a default DRX cycle time or a predetermined DRX cycle time. In some embodiments, the collecting the PTT usage data for a PTT client includes: determining whether a PTT usage level of the PTT client exceeds a predetermined threshold; and collecting the PTT usage data for the PTT client in response to the PTT usage level exceeding the predetermined threshold.

In accordance with a preferred embodiment of the present invention, a method includes: determining, by a push-to-talk (PTT) server, a selection criteria for PTT clients accessing the PTT server; selecting, by the PTT server, a subset of the PTT clients that satisfy the selection criteria; creating, by the PTT server, a discontinuous reception (DRX) mode policy for the subset of the PTT clients; and transmitting, by the PTT server, the DRX mode policy to the subset of PTT clients.

In some embodiments, the selection criteria indicates which PTT clients should be selected. In some embodiments, the selection criteria indicates that PTT clients that located in a particular geographic area should be selected. In some embodiments, the method further includes: serializing, by the PTT server, the DRX mode policy to a serialized document. In some embodiments, the transmitting the DRX mode policy to the PTT clients includes: transmitting, by the PTT server, the serialized document in session initiation protocol (SIP) messages to the PTT clients. In some embodiments, the DRX mode policy indicates a plurality of DRX slots, and further indicates, for each of the DRX slots, DRX cycle times the PTT clients should use. In some embodiments, the DRX mode policy indicates a plurality of DRX slots, and further indicates, for each of the DRX slots, whether the PTT clients should use a default DRX cycle time or a predetermined DRX cycle time. In some embodiments, the determining the selection criteria includes: determining a predetermined threshold for PTT usage level of the PTT clients.

In accordance with a preferred embodiment of the present invention, a client device includes: a processor; and a computer readable storage medium storing programming for execution by the processor, the programming including instructions for: accessing a discontinuous reception (DRX) mode policy, where the DRX mode policy is in accordance with push-to-talk (PTT) usage patterns; selecting a DRX cycle time based on the DRX mode policy; and applying the DRX cycle time to a cellular network interface of the client device.

In accordance with a preferred embodiment of the present invention, a push-to-talk (PTT) server includes: a processor; and a computer readable storage medium storing programming for execution by the processor, the programming including instructions for: collecting PTT usage data for a PTT client, the PTT usage data including information about calls made and received by the PTT client; determining usage patterns according to the PTT usage data; creating a discontinuous reception (DRX) mode policy according to the usage patterns; and transmitting the DRX mode policy to the PTT client.

In accordance with a preferred embodiment of the present invention, a push-to-talk (PTT) server includes: a processor; and a computer readable storage medium storing programming for execution by the processor, the programming including instructions for: determining a selection criteria for PTT clients accessing the PTT server; selecting a subset of the PTT clients that satisfy the selection criteria; creating a discontinuous reception (DRX) mode policy for the subset of the PTT clients; and transmitting the DRX mode policy to the subset of PTT clients.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A and 4B illustrate example DRX mode policies;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and alterations can be made herein without departing from the spirit and scope of this disclosure as defined by the appended claims.

Various embodiments are described within a specific context, namely, one-touch calling in a push to talk (PTT) system. Various embodiments may, however, be applied to other systems and networks where one-touch calling or discontinuous reception (DRX) mode selection is desirable.

One-touch calling features allow users to select an action triggered by a PTT button on a client device (or accessory) while a PTT client on the device is idle. With one-touch calling, behavior of the PTT button for the client device may be configured (e.g., by the user) such that the PTT client is brought to the foreground and a call is made in response to a press of the PTT button. One-touch calling may provide advantages in industries such as the transportation industry, where distracted driving regulations may exist. One-touch calling may also provide a simplified calling experience for PTT users (e.g., users who primarily communicate with a single contact or group). Various embodiments provide one-touch calling with improved (e.g., shorter) call setup times using DRX mode selection. In particular, DRX modes may be selected based on a DRX mode policy, which improves call setup times and conserves battery life of PTT client devices. Embodiment techniques may reduce call setup times in one-touch dialing systems, where predictive wakeup techniques may not sufficiently help reduce setup times. Various embodiments provide one or more of the following non-limiting features: (1) defining one-touch PTT calling behavior; (2) supporting opening of the PTT client to a user-configurable default tab when a PTT button is pressed; and (3) providing consistency between PTT accessories (e.g., wired and/or Bluetooth accessories) and dedicated hardware buttons on client devices. Embodiments may also provide a way for users to quickly access a particular screen of a PTT client (e.g., call history, contacts, groups, favorites, and the like), by allowing a user-configurable default tab to be opened on the PTT client when the PTT button is pressed.

Figure 1:
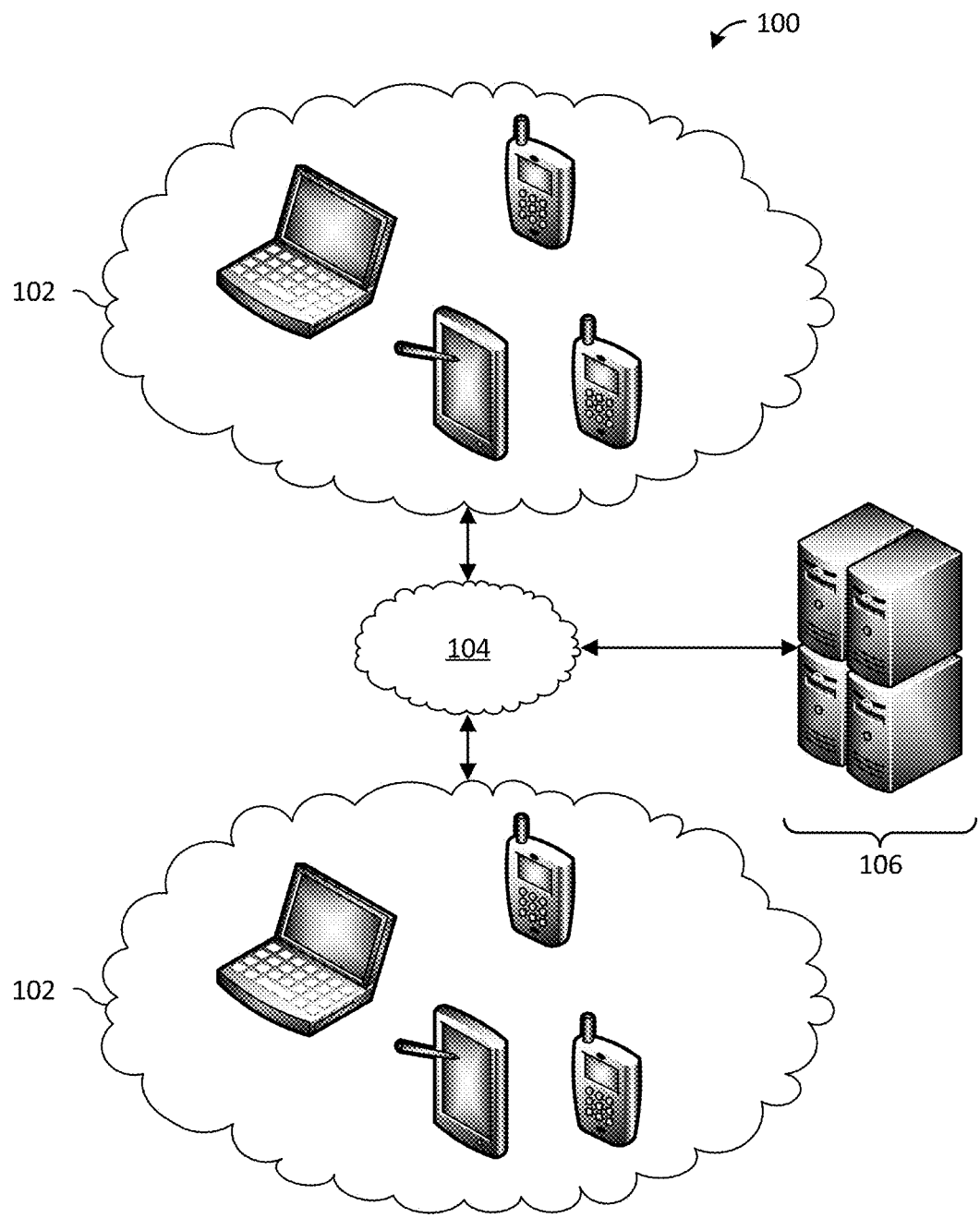
FIG. 1 illustrates a communications system.

FIG. 1 illustrates a communications system 100, which provides an architecture for supporting a PTT communications solution in accordance with some embodiments. The communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices.

Applications (referred to hereinafter as "PTT clients") reside on the client devices 102 for accessing various PTT functions.

The client devices 102 may communicate with the PTT platform 106 over the communications network 104, which may be accessed by the client devices 102 through a cellular network deployed by a carrier, a WiFi network, a radio access network (RAN), other wireless networks, a wired internet protocol (IP) network, combinations thereof, or the like. The communications network 104 may include one or more components configured to provide wireless or wired network access, such as an enhanced base station (eNB), a macro-cell, a femtocell, a Wi-Fi access point (AP), combinations thereof, or the like. Furthermore, the communications network 104 may operate in accordance with one or more wireless communication protocols, e.g., long term evolution (LTE), LTE advanced (LTE-A), High Speed Packet Access (HSPA), Wi-Fi 802.11a/b/g/n/ac, etc. In some embodiments, the communications network 104 may comprise various other devices, such as relays, low power nodes, etc. The communications network 104 may further include backhaul network components, such as various gateways, routers, controllers, schedulers, and the like.

In an embodiment where the PTT platform 106 is a PTT-over-Cellular (PoC) platform, subscribers to a PTT solution (e.g., users operating the client devices 102) may be provisioned onto the communications system 100 via interfaces to carriers (e.g., cellular carriers). PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. The PTT platform 106 may provide a plurality of PTT functions to the client devices 102 through the PTT clients on the client devices 102 as described in greater detail below.

In some embodiments, the PTT platform 106 uses container technology for virtualization of a PTT system architecture, such as, the virtualization of provided PTT services. Example container technologies may include Docker, Rocket, LXD, and the like although the architecture is not limited to a specific container technology. Virtualization using container technology may allow the PTT platform 106 to adopt a micro-services model in which service clusters are considered the building blocks of the system architecture. For example, each function provided by the PTT platform 106 may be virtualized in a unique service cluster, and each service cluster may perform a different function in the PTT platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, the PTT platform 106 incorporates distributed databases, clustering technologies, data analytics tools, and messaging middleware to provide a robust, scalable platform. The PTT platform 106 may use fully virtualized components with a layered approach to service orchestration, which allows the PTT platform 106 to be integrated into various cloud environments, such as a carrier's private cloud infrastructure, a dedicated PTT cloud infrastructure, combinations thereof, and the like. A more detailed description of an embodiment telecommunications platform may be found in commonly-assigned U.S. patent application Ser. No. 14/994,757 filed on Jan. 13, 2016, entitled "System and Method for Elastic Scaling using a Container-Based Platform," which is hereby incorporated by reference. Other telecommunication services platforms, including other PTT platforms, may be used in other embodiments.

Embodiment PTT clients executing on the client devices 102 support one-touch calling features with a dedicated or assignable PTT button (not shown). With one-touch calling, behavior of the PTT button of the client device 102 may be configured (e.g., by the user) such that the PTT client is brought to the foreground of the 102 and a call is made in response to a press of the PTT button. The recipient of the call may be configured by the user. For example, the user may set the PTT button to make a call to a most recent history entry, a particular contact, a particular group, or the like. Furthermore, the landing page of the PTT client triggered by the PTT button may also be configured by the user. For example, the user may set the PTT button to bring up a particular screen (e.g., History, Contacts, Groups, Favorites, and the like) of the PTT client in response to a press of the PTT button. The PTT button may be used to invoke a user selected action under one or more of following conditions: (1) the PTT client is idle (e.g., not in a PTT call) and executing in the background, and the client device 102 screen is on; (2) the PTT client is idle (e.g., not in a PTT call) and executing in the background, and the client device 102 screen is off; (3) the PTT client is idle (e.g., not in a PTT call) and the client device 102 screen and/or keypad is locked; and (4) the PTT client is in the foreground and on a home/history screen of a client device 102 (e.g., when the client device is a smart phone).

The PTT button may be a dedicated button, an assignable button, or on an accessory button. In some embodiments, the PTT button is a switch, button, or key built into the client devices 102. For example, in an embodiment, a client device 102 may be a ruggedized device that has a dedicated or assignable PTT button. In some embodiments, the client devices 102 may be used with compatible accessories, which provide the PTT button. Such accessories may be separate from but connected (e.g., with a wired or wireless connection) to a client device 102, such as, a client device 102 without a dedicated or assignable PTT button. In embodiments where the PTT button is an assignable button, the client device 102 provides key press and release events to the PTT client when the assignable button is assigned to PTT, and the assignable button may be automatically assigned to PTT when the PTT client is present on the client device 102.

The PTT button may be exempt from a keypad lock that may be performed by the client device 102, such that PTT button press and release events are provided to the PTT client when the screen is off and/or screen lock is enabled (e.g., swipe or secure screen lock). In some embodiments, a first press of the PTT button causes the PTT client to come to the foreground in addition to turning on the display. Press and release events of the PTT button may be provided to the PTT client while PTT client is executing in the background. The PTT button has a mechanical design that may reduce accidental key press. In an embodiment, accidental key presses of the PTT button are reduced by decreasing sensitivity of the PTT button. One of more functions of the PTT client may be programmatically assigned to the PTT button.

For embodiment client devices 102 supporting wired PTT accessories and/or having a dedicated or programmable button for PTT calling, background call handling may be processed through a messaging object, such as Android intents. Indicators of the PTT button activity may be provided as events via the messaging object. For example, in an embodiment where Android intents are used, the events may be provided through a MEDIA_BUTTON action. Foreground call handling may be processed through an event objects, such as Android keycodes. For example, in embodiments where an Android keycode is used, the event may be provided through the KEYCODE_HEADSETHOOK. In some embodiment, the duration of the pulse (e.g., the time between the PTT button being pressed and released) may be configured. Different events may be configured to correspond to different durations of the pulse. For example: (1) floor requests may be trigged through a pulse of at least 140 ms; (2) floor releases may be trigged through a pulse of at least 500 ms; (3) a minimum time between requests and releases (e.g., about 500 ms) may be required; and (4) a minimum time between releases and the next request (e.g., about 250 ms) may be required. It should be appreciated that the specific time durations and example events in this paragraph are for the sake of illustration only, and are not meant to limit various embodiments in any way.

In some embodiments, the PTT button provides different events for different operational modes of the PTT client. For example, the PTT button may provide different events based on whether the PTT client is the foreground or background, whether the screen is locked or turned off, whether the keypad is locked, or a combination thereof.

Audio devices on the client devices 102 may also include one or more of the following non-limiting parameters: (1) a speaker power of from about 80 dBm to about 100 dBm; (2) an audio playout/record latency of less than 50 ms for microphone to vocoder (on the encoder side) and vocoder to speaker (on the decoder side); and (3) a Bluetooth audio connection that avoids entering sleep/idle mode (e.g., using audio keep alive requests at regular intervals, such as about every 50 seconds).

The client devices 102 may further have particular networking or processing capabilities. The client devices 102 may support a network round trip packet delay of 75 ms or less for a LTE network, and have a processor of at least 1000 MHz supporting multi-threaded architectures. The PTT button for the client devices 102 (e.g., dedicated/assignable button, wired PTT accessories, or wireless PTT accessories) may provide button press event notifications to the client devices 102 in 50 ms or less.

Adjusting the DRX mode adjusts the paging cycles for the network interface. The client devices 102 have the capability to adjust the DRX mode or cycle of the cellular network interfaces on the client devices 102, which may include LTE interfaces. For example, a vendor of the LTE interface for the client device 102 may provide an application program interface (API) that allows the DRX mode of the LTE interface to be adjusted. Likewise, the DRX mode may be adjusted via radio interface layer (RIL) extension hook hardware of the client devices 102. In open source operating systems (e.g., Android devices, custom operating system devices, and the like), the DRX mode may be adjusted with the APIs. In some embodiments, the RIL extension hooks may be used by the PTT client in combination with the APIs to control DRX parameters.

The DRX cycle may be set to a variety of values. Shorter DRX cycles (e.g., faster DRX modes) generally correlate to faster battery drain times (e.g., shorter battery life) while longer DRX cycles (e.g., slower DRX modes) generally correlate to slower battery drain times (e.g., longer battery life). In an embodiment, the DRX cycle may be set to one of the following values: 320 ms; 640 ms; 1280 ms; or 2560 ms. The network interface may default to a long DRX cycle that may conserve battery life, such as 2560 ms, and may be adjusted down by the PTT client. Although the illustrated embodiment shows example times for various DRX modes, it should be appreciated that other times may be used on other embodiments depending on system configuration. Furthermore, while the above embodiment provides four values for four DRX modes, other embodiments may have different extension APIs that provide any number of DRX modes.

Various embodiments include client and/or server algorithms that adjust the DRX mode to speed up call setup while balancing battery consumption. In particular, PTT clients may adjust the DRX cycles via the network interface API to select faster DRX modes based on PTT usage statistics, geographical location of the PTT client, emergency situations near the PTT client, and/or other considerations. In some embodiments, the PTT client may select an appropriate DRX mode for improved performance during some time periods, and may select an appropriate DRX mode for improved battery life in other time periods. As explained in greater detail below, PTT clients may select a slower DRX mode during times of predicted low PTT usage in order to conserve battery life, and may select a faster DRX mode during times of predicted high PTT usage in order to improve call set up times. Predictions of PTT usage may be based on historic PTT usage statistics. An embodiment PTT client uses the PTT usage statistics to set DRX modes and/or paging cycles of a client device 102 for improved call set up speeds for both the originating device and the terminating device. In some embodiments, the PTT client may select an appropriate DRX mode during emergency situations. As explained in greater detail below, PTT clients may select a higher DRX mode when they are located in a geographical area that has been marked as containing an emergency situation, such as a fire, traffic incident, threat to public safety, or the like. An embodiment PTT client increases the DRX modes and/or paging cycles when near an ongoing emergency may increase the user experience or safety for PTT users.

Figure 2:
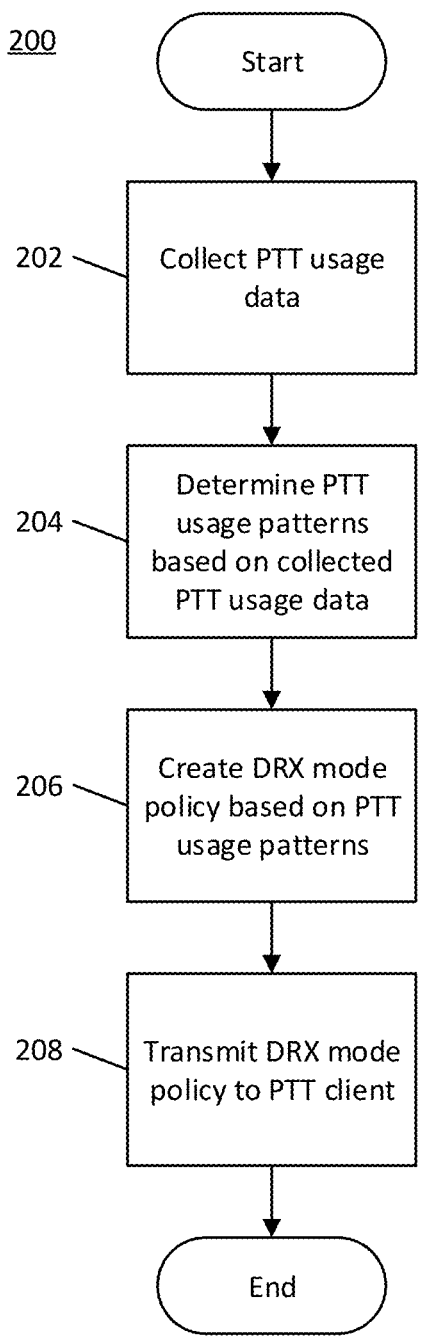
FIG. 2 illustrates an example flow diagram for configuring DRX modes for a PTT client.
Figure 3:
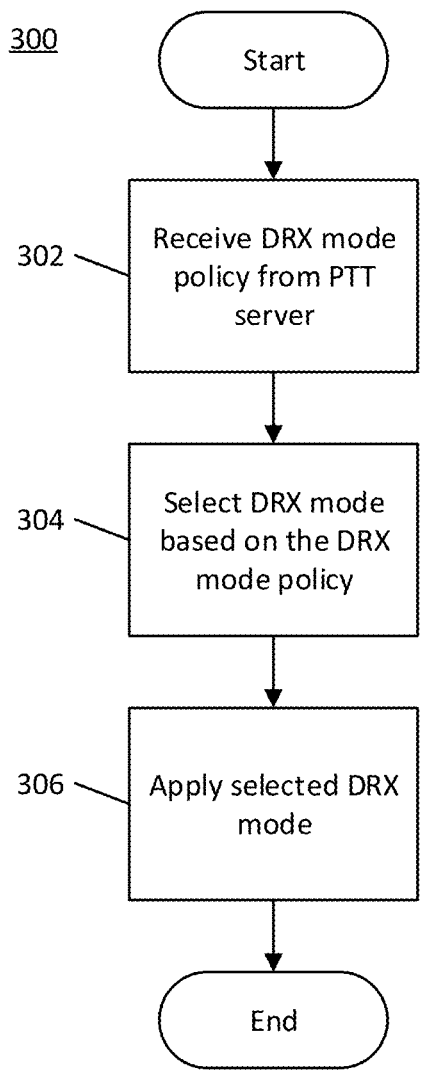
FIG. 3 illustrates an example flow diagram for configuring DRX modes for a PTT client.

FIGS. 2 and 3 illustrate example flow diagrams for configuring DRX modes for a PTT client. In the embodiment shown in FIGS. 2 and 3, a DRX mode policy based on PTT usage patterns is determined by the PTT server and transmitted to a PTT client. For example, the PTT server may set a DRX mode policy that directs the PTT client to select particular DRX modes at different times of day. The DRX mode policy is transferred to the PTT client, which selects DRX modes according to the policy. In some embodiments, the PTT client defaults to a longer DRX cycle, and the DRX mode policy designates particular times when the PTT client should select a shorter DRX cycle. In some embodiments, the PTT client defaults to a shorter DRX cycle, and the DRX mode policy designates particular times when the PTT client should select a longer DRX cycle.

FIG. 2 illustrates a method 200 for creating and sending the DRX mode policy to a PTT client. The method 200 may be performed by a PTT server for a particular PTT client. The DRX mode policy may direct the PTT client to select different DRX modes based on predicted PTT usage.

In step 202, the PTT server collects PTT usage data based on activities of one or more PTT clients in the PTT platform 106. The one or more PTT clients may include the PTT client, which the PTT server is creating a DRX mode policy for, and one or more additional PTT clients, which the PTT client has communicated with. The PTT usage data is collected based on historic usage data of the PTT platform 106. The usage data may be collected from the PTT client when the PTT client logs in; in such embodiments, the PTT client may transmit the previous 24 hours of usage data when logging in. The usage data may also be collected through periodic reporting by the PTT client (e.g., every 24 hours), or on demand from the PTT client with a request message.

In step 204, the PTT server determines PTT usage patterns for the PTT client based on the collected PTT usage data. In some embodiments, the PTT server classifies the PTT usage for the PTT client in several categories, such as peak, busy, and normal hours. The PTT usage data may be specific to the PTT client and may be analyzed and classified using a variety of techniques. Some example embodiments for analyzing and classifying the PTT usage data are detailed further below.

In step 206, the PTT server creates a DRX mode policy for the PTT client based on the PTT usage patterns. The DRX mode policy specifies DRX modes the PTT client should use at different times. For example, the DRX mode policy may specify a shorter DRX cycle at times of the day when the PTT usage is expected to be higher than average.

In step 208, the DRX mode policy is transmitted to the PTT client. In an embodiment, the PTT server transmits the DRX mode policy to the PTT client using a serialized format, such as extensible markup language (XML), JavaScript object notation (JSON), or the like. The DRX mode policy may be sent through messaging mechanisms, such as session initiation protocol (SIP) NOTIFY messages. In some embodiments, the DRX mode policy is transmitted to the PTT client periodically. In some embodiments, the PTT client may periodically request the new DRX mode policy. For example, the DRX mode policy may be transmitted at any suitable interval, such as weekly, daily, periodically throughout each day, or the like. In some embodiments, the DRX mode policy is transmitted to the PTT client on demand and/or based on an event trigger. For example, the DRX mode policy may be transmitted when the PTT client requests the DRX mode, when the PTT client logins into the PTT platform 106, and the like.

FIG. 3 illustrates a method 300 for applying the DRX mode policy on a PTT client. The method 300 may be performed by a PTT client.

In step 302, the PTT client receives the DRX mode policy from the PTT server. Receiving may include receiving a serialized message including the DRX mode policy, and deserializing the message.

In step 304, the PTT client selects a DRX mode based on the DRX mode policy. In some embodiments, the DRX mode policy may specify a particular DRX mode (e.g., cycle time) for different parts of a time span. The DRX mode policy may directly specify the cycle time, or may indicate an identifier mapped to cycle times. In some embodiments, the DRX mode policy may divide the time span into DRX slots of the same length, and specify whether the PTT client should operate in one of two predetermined modes that are configured at the PTT client. For example, a first of the predetermined modes may be a battery-saving DRX cycle, and a second of the predetermined modes may be a high-performance DRX cycle. In an embodiment, the DRX mode policy indicates whether the PTT client should operate in the first or the second predetermined mode for each DRX slot by indicating whether each slot is "on" (corresponding to the first mode, such as a DRX cycle of 2560 ms) or "off" (corresponding to the second mode, such as a DRX cycle of 640 ms).

In step 306, the PTT client implements the DRX mode selected based on the DRX mode policy. For example, the PTT may implement a faster or slower DRX cycle as selected based on the DRX mode policy. As noted above, the DRX mode change may be implemented through an API or an RIL extension hook on the client device 106.

The methods shown in FIGS. 2 and 3 illustrate embodiments where the PTT server determines the DRX mode policy, and the PTT client implements the DRX mode policy. However, it should be appreciated that the methods shown in FIGS. 2 and 3 may be implemented by a PTT server and client or entirely on a PTT client. For example, the PTT client could perform steps 202 through 206 and 304 through 306 so that the DRX mode policy is determined and implemented locally at the client device 106.

FIGS. 4A and 4B illustrate example DRX mode policies. FIG. 4A shows a DRX mode policy in embodiments where the DRX mode policy specifies the cycle times. In FIG. 4A, the "category" element indicates a predetermined DRX category that corresponds to specific PTT usage scenarios. An example listing of the categories and usage scenarios is shown in Table 1. In the embodiment shown, the DRX mode policy designates particular time(s) of the day, week, month, and the like, where a particular DRX cycles should be selected.

TABLE 1

Example DRX Mode Policy Categories.

| Category | Scenario | DRX Cycle |
|---|---|---|
| 1 | Peak | 320 ms |
| 2 | Busy | 640 ms |
| 3 | Normal | 1280 ms |
| 4 | Offline, Do Not Disturb, Wi-Fi Only, Etc. | 2560 ms |

FIG. 4B shows a DRX mode policy in embodiments where the DRX mode policy merely specifies that the PTT client should operate in an "on" or "off" mode at various DRX slots. In FIG. 4B, the "drx-slots" indicates the states of each DRX slot, which each have a duration specified by the "duration" element. A "0" for a DRX slot indicates that the PTT client should operate in the default mode (e.g., battery saving mode, or category 3 from above) during that slot. A "1" for a DRX slot indicates that the PTT client should operate at a predefined lower DRX cycle (e.g., high performance mode, such as categories 1 or 2) during that DRX slot.

Figure 5:
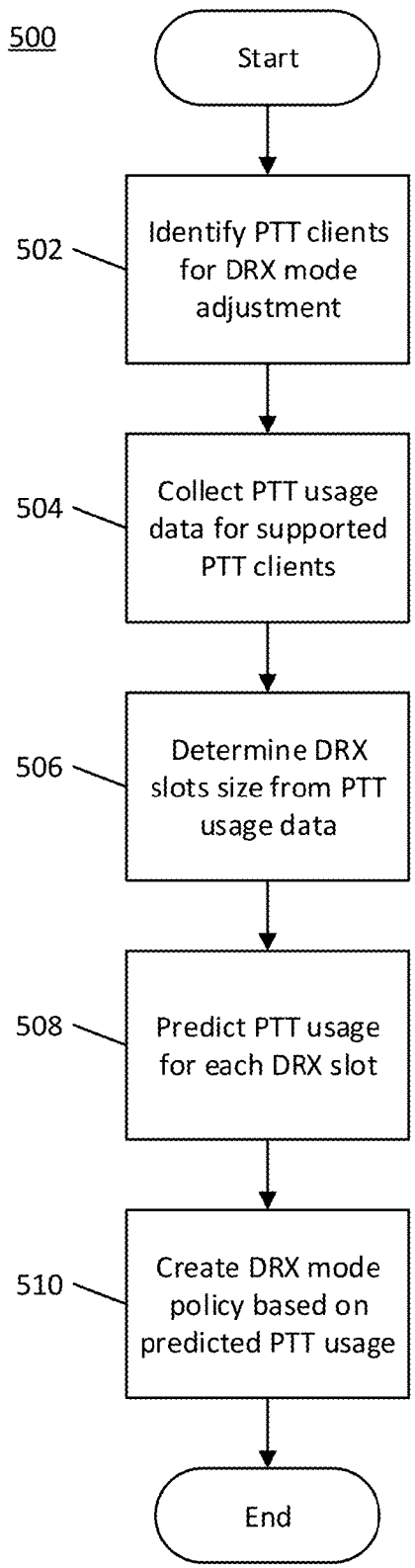
FIG. 5 illustrates a method for generating a DRX mode policy.

FIG. 5 illustrates a method 500 for generating a DRX mode policy from PTT usage patterns. The method 500 may be performed by PTT clients, PTT servers, or a combination thereof. The method 500 may also be performed by a data analytics server or platform that may or may not be part of the PTT server. In an embodiment, the data analytics server is separate from the PTT server and has access to the PTT usage data. The DRX mode policy is generated for a configurable future time period for a PTT client. In an embodiment, a new DRX mode policy having a time period of 24 hours is generated each day for each of the PTT clients.

The method 500 illustrates a heuristic approach to predicting future PTT usage of a PTT client by using past and current PTT usage data of the PTT client. Conceptually, the method 500 includes two portions: (1) dividing the time period of the DRX mode policy into segments (DRX slots)

(e.g., steps 502 through 506); and (2) assigning DRX modes to each segment (DRX slot) of the time period (e.g., steps 508 through 510). For example, steps 502 through 506 may be used to divide the time period into a "morning" segment and an "afternoon" segment, and steps 508 through 510 may be used to assign the "morning" segment to a battery-saving DRX mode and the "afternoon" segment to a high-performance DRX mode.

In step 502, the data analytics server identifies PTT clients to be used for DRX mode adjustment. The PTT clients may include those that support DRX mode adjustment. Of the PTT clients communicating via the PTT platform 106, a subset may support DRX mode adjustment. Support for DRX mode adjustment may depend on the wireless communications technology the client devices 102 use. For example, client devices 102 communicating over cellular networks such as LTE may support DRX mode adjustment, and client devices 102 communicating over Wi-Fi may not support DRX mode adjustment. In some embodiments, the PTT clients for which usage data is analyzed is further limited to client devices 102 for which DRX mode adjustment is enabled. Further, in some embodiments, the total quantity of PTT clients for which usage data is analyzed may be limited. For example, PTT clients with PTT usage data outside of a call log audit interval may be excluded, and PTT clients with PTT usage data that has been recently analyzed within a call log audit time period may be excluded.

In some embodiments, PTT clients are categorized according to their PTT usage. For example, PTT clients may be categorized as "high," "medium," and "low" usage clients. DRX mode policies may be more effective for higher usage clients, as those clients may have more consistent usage patterns. For example, DRX mode policies may be 90% effective for high users, 70% effective for medium users, and less than 70% effective for low users. In some embodiments, DRX mode policies are generated only for clients with a predicted efficiency above a configurable threshold. For example, DRX mode policies may be generated for high usage clients or for high and medium usage clients, and the DRX mode policies may not be generated for low usage clients.

In step 504, the data analytics server collects PTT usage data for the supported PTT client. PTT usage data may include: (1) call usage of calling parties; (2) message data usage of calling parties; (3) parties called; (4) time of the day (e.g., busy hours) of PTT usage; (5) weekly and/or monthly calling or message usage; (6) group calling/messaging usage; (7) group member calling/messaging usage; (8) predictive wakeup data and/or trigger usage; (9) combinations thereof; or (10) the like. As used above, the term "messaging" may refer to Push-to-X (PTX), which may include any type text, voice, video, pictures, instant personal alerts, or the like. Usage data is maintained and collected per subscriber (e.g., PTT client) of the PTT platform 106. Usage data is collected in a sliding window of configurable width, such as 24 hours. For new PTT clients where insufficient usage data is available, a cumulative analysis of the usage data may be performed until there is sufficient usage data for the PTT client to fill the sliding window.

In some embodiments, PTT usage data is stored and sorted by the PTT client, PTT server, and/or data analytics server based on the type of usage and the pattern of usage. PTT usage data may be dynamically updated periodically (e.g., every day) based on data collected from monitoring behaviors of one or more of the PTT clients in the PTT platform 106. The usage data may be kept in a database accessible to the data analytics server, and the database may be periodically purged of stale usage data (e.g., usage data older than a configurable time period).

In step 506, the data analytics server determines the DRX slot size for the time period from the PTT usage data. The DRX slot size for the time period is determined for each PTT client. The time period may be divided into slots having durations of at least a minimum inter-arrival threshold time. The duration of particular slots may be increased if PTT usage data during a particular slot indicates contiguous bursts of activity that are greater than the minimum threshold time. For example, if the minimum threshold time is 5 minutes, but the usage data indicates a burst of PTT activity lasting 7 minutes, then that PTT usage data may be classified in a slot having a duration of 7 minutes. Likewise, if a period of time has no PTT usage data, then that slot may default to the minimum of 5 minutes. Once the PTT usage data has been classified in slots of various duration, an average slot duration may be determined, and then rounded up or down so that the average slot is an integer multiple of the minimum threshold time. The rounded slot size is used as the DRX slot size. In embodiments where several days of usage data are considered, an average slot size may be determined for each day, and then the cumulative average of the average slot size of each day may be rounded to determine the DRX slot size.

In step 508, the data analytics server predicts PTT usage for each DRX slot in the DRX mode policy from the PTT usage data. The sliding window may be divided into periods having a duration of the DRX slot size, and historic activity in each slot of the sliding window may be counted. The historic activity that is counted may include the total number of incoming calls (of all types) per DRX slot, and the total number of outgoing calls (of all types) per DRX slot. In some embodiments, other activity such as IPAs, messages, pictures, video data, and the like per DRX slot may be counted. Once the historic activity in each DRX slot (e.g., past slots) is counted, future activity in the DRX slots (e.g., future slots) of the DRX mode policy is predicted. PTT usage may be predicted for each DRX slot using a time series analysis that predicts future activity from past and current activity, such as the Holt-Winters time series analysis. The predicted PTT usage for each DRX slot may then be stored in the database.

In step 510, the DRX mode policy is created based on the predicted PTT usage. The predicted PTT usage for each DRX slot may be classified. DRX mode policy is created from the usage for the DRX slots stored in the database, and is then serialized for transmission to the PTT clients.

In embodiments where the DRX mode policy specifies the DRX cycle times, each DRX slot is classified into applicable categories (e.g., peak, busy, normal, and idle), which may correspond to the different DRX modes available to PTT clients. Categorizing the DRX slots may include comparing the quantity of activity in each slot to thresholds corresponding to the different categories. A DRX mode policy having the format shown in FIG. 4A may be generated. As explained above in FIG. 4A, the categories correspond to the different DRX modes available to PTT clients.

In embodiments where the DRX mode policy specifies that the PTT client should operate in an "on" or "off" mode at various DRX slots, each DRX slot is marked as "DRX on" or "DRX off" based on the predicted activity in that DRX slot. Marking the DRX slots may include determining whether the predicted activity in each slot exceeds a configurable threshold. A DRX mode policy having the format shown in FIG. 4B may be generated. As explained above in FIG. 4B, an indication that a slot should be "on" indicates the PTT client should reduce the DRX cycle for that DRX slot, thereby decreasing call setup times. An indication that a slot should be "off" indicates the PTT client should not reduce the DRX cycle for that DRX slot, thereby conserving battery life.

Once generated and serialized, the DRX mode policy may be stored, or it may be transmitted to the PTT client. Thus, the PTT usage data/pattern may be used to create a DRX mode policy, which is used to select an appropriate DRX mode at the PTT client, based on historical usage patterns.

Figure 6:
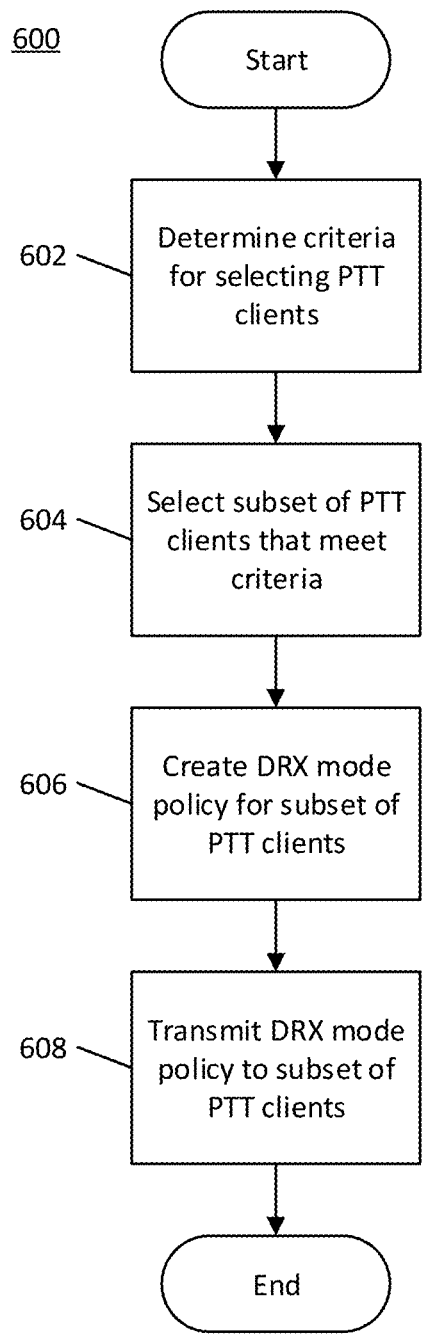
FIG. 6 illustrates an example flow diagram for configuring DRX modes for a PTT client.

FIG. 6 illustrates a method 600 for configuring DRX modes for a PTT client. The method 600 illustrates a deterministic approach to predicting future PTT usage of PTT clients by selecting a subset of the PTT clients that should have particular DRX cycles. For example, some PTT clients, such as PTT clients located near an emergency situation, may be configured to have faster call setup times. In the embodiment shown in FIG. 6, a DRX mode policy for a subset of PTT clients is determined by the PTT server and transmitted to the PTT clients. The PTT clients may be clients that are in a particular area. For example, certain PTT users that are respond to an emergency situation may be part of the subset of PTT clients. The PTT clients may also be based on other attributes, such as membership in a group. For example, PTT clients that are part of a "fire" group may all be selected. In some embodiments, the PTT client defaults to a longer DRX cycle, and the DRX mode policy designating a shorter DRX cycle is to decrease call setup times for the selected PTT clients. The PTT server determines which PTT clients receive the DRX mode policy. The DRX mode policy may indicate a time period for the shorter DRX cycle, which may be chosen to include the time of peak attention to the emergency incident. The selected PTT clients receive the DRX mode police, and use the indicated DRX cycle in the times indicated by the policy.

In step 602, the PTT server determines a criteria for selecting the subset of PTT clients that the DRX mode policy should apply to. In some embodiments, the selection criteria indicates the PTT clients that enter or leave a particular geographic area should be selected. For example, the PTT server may periodically collect the locations of the PTT clients, and the selected PTT clients may be PTT clients that are near an emergency situation. The location of the emergency situation may be specified by an operator. In some embodiments, the selection criteria indicates the PTT clients that are members of a particular group marked with an activity attribute should be selected. For example, a group may be created for clients such as "fire." The groups and membership may be specified by the operator, and the attribute may be enabled and disabled by the operator. For example, the "fire" group may be marked as "active" by the operator when PTT users in the "fire" group are responding to an ongoing emergency, such as a fire, and the "fire" group may be marked as "inactive" when the emergency situation has passed. In some embodiments, a combination of group and geographic location may be used. For example, the selected PTT clients may include "hazmat" users in a particular geographic area.

In step 604, the PTT server selects the subset of PTT clients that meet the PTT criteria. Selection may include marking those PTT clients for reception of the DRX mode policy.

In step 606, the PTT server creates a DRX mode policy for the PTT client that are selected as being in the subset of PTT clients. The DRX mode policy specifies DRX modes the PTT client should use at different times. For example, the DRX mode policy may specify a shorter DRX cycle for a time period. The DRX mode policy may indicate a start time, or may indicate an immediate start. The DRX mode policy may also indicate a validity period, which may be a configurable amount of time. For example, a validity period that is likely to include the time of peak incident attention may be chosen by the operator. The DRX mode policy may have the format shown in FIG. 4A or 4B.

In step 608, the DRX mode policy is transmitted to the selected PTT clients. The transmission in step 608 may be similar to the transmission in step 208, and so details are not repeated herein. When the PTT clients receive the DRX mode policy, they may apply it in a manner similar to the method 300 illustrated above in FIG. 3. For example, the DRX mode policy may specify the DRX cycles for a time period, and the PTT client may set the DRX mode to that cycle time in that time period.

The method 600 illustrates embodiments where the PTT server determines the DRX mode policy based on deterministic criteria. However, it should be appreciated that the method 600 may be implemented by a PTT server or entirely on a PTT client. For example, the PTT client could perform steps 602, 606, and 608 so that the DRX mode policy is determined and implemented locally at the client device 106. In such embodiments, instead of performing step 604, the PTT client may autonomously determine whether it meets the criteria, e.g., whether it should apply a shorter or longer DRX cycle. The criteria may be based on recent call activity. The PTT client may determine to apply a shorter or longer DRX cycle based on the PTT client having recently made a call to a PTT group having a predefined attribute. The predefined attribute of the group and the amount of elapsed time for the call to be classified as recent may be configurable by the operator. For example, the predefined attribute may be an indication that the recently called PTT group is a call group including PTT users responding to an emergency situation, e.g., an emergency call group.

Figure 7:
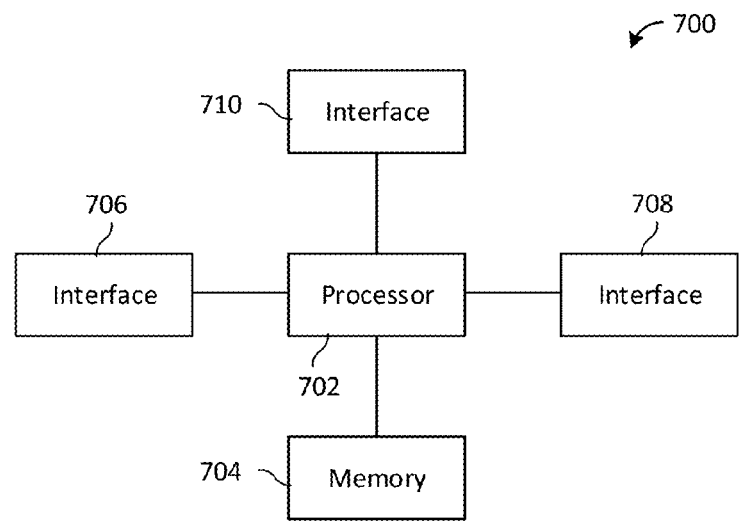
FIG. 7 is a block diagram of a processing system.

FIG. 7 is a block diagram of a processing system 700 for performing methods described herein, which may be installed in a host device. As shown, the processing system 700 includes a processor 702, a memory 704, and interfaces 706-710, which may (or may not) be arranged as shown in FIG. 7. The processor 702 may be any component or collection of components adapted to perform computations and/or other processing related tasks, and the memory 704 may be any component or collection of components adapted to store programming and/or instructions for execution by the processor 702. In an embodiment, the memory 704 includes a non-transitory computer readable medium. The interfaces 706, 708, 710 may be any component or collection of components that allow the processing system 700 to communicate with other devices/components and/or a user. For example, one or more of the interfaces 706, 708, 710 may be adapted to communicate data, control, or management messages from the processor 702 to applications installed on the host device and/or a remote device. As another example, one or more of the interfaces 706, 708, 710 may be adapted to allow a user or user device (e.g., personal computer (PC), etc.) to interact/communicate with the processing system 700. The processing system 700 may include additional components not depicted in FIG. 7, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 8:
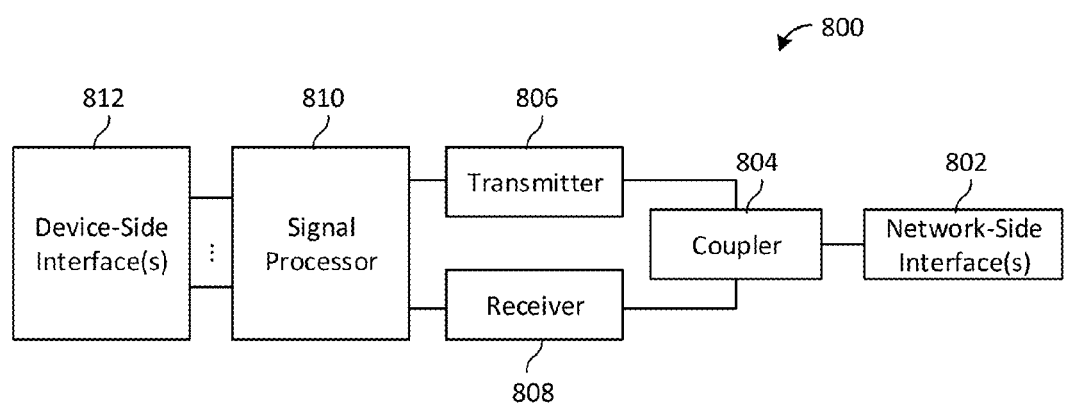
FIG. 8 is a block diagram of a transceiver.

In some embodiments, one or more of the interfaces 706, 708, 710 connects the processing system 700 to a transceiver adapted to transmit and receive signaling over the telecommunications network. FIG. 8 is a block diagram of a transceiver 800 adapted to transmit and receive signaling over a telecommunications network. The transceiver 800 may be installed in a host device. As shown, the transceiver 800 comprises a network-side interface 802, a coupler 804, a transmitter 806, a receiver 808, a signal processor 810, and a device-side interface 812. The network-side interface 802 may include any component or collection of components adapted to transmit or receive signaling over a wireless or wireline telecommunications network. The coupler 804 may include any component or collection of components adapted to facilitate bi-directional communication over the network-side interface 802. The transmitter 806 may include any component or collection of components (e.g., up-converter, power amplifier, etc.) adapted to convert a baseband signal into a modulated carrier signal suitable for transmission over the network-side interface 802. The receiver 808 may include any component or collection of components (e.g., down-converter, low noise amplifier, etc.) adapted to convert a carrier signal received over the network-side interface 802 into a baseband signal. The signal processor 810 may include any component or collection of components adapted to convert a baseband signal into a data signal suitable for communication over the device-side interface(s) 812, or vice-versa. The device-side interface(s) 812 may include any component or collection of components adapted to communicate data-signals between the signal processor 810 and components within the host device (e.g., the processing system 700, local area network (LAN) ports, etc.).

The transceiver 800 may transmit and receive signaling over any type of communications medium. In some embodiments, the transceiver 800 transmits and receives signaling over a wireless medium. For example, the transceiver 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 802 comprises one or more antenna/radiating elements. For example, the network-side interface 802 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 800 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
    collecting, by a client device, PTT usage data for the client device, the PTT usage data including information about calls made and received by the client device;
    determining, by the client device, usage patterns according to the PTT usage data;
    creating, by the client device, a discontinuous reception (DRX) mode policy according to the usage patterns, wherein the mode policy is created in response to the PTT usage data indicating a recent call to a PTT group having a predefined attribute, wherein the predefined attribute is an indication that the PTT group is an emergency call group;
    accessing, by the client device, the DRX mode policy, wherein the DRX mode policy is in accordance with push-to-talk (PTT) usage patterns of at least the client device;
    selecting, by the client device, a DRX cycle time based on the DRX mode policy; and
    applying, by the client device, the DRX cycle time to a cellular network interface of the client device.

2. The method of claim 1, wherein accessing the DRX mode policy comprises:
    receiving, by a client device, the DRX mode policy from a server.

3. The method of claim 1, further comprising:
    updating, by the client device, the DRX mode policy.

4. The method of claim 3, wherein the DRX mode policy is updated by the client device at regular intervals.

5. The method of claim 3, wherein the DRX mode policy is updated by the client device in response to the client device logging into a PTT network.

6. The method of claim 1, wherein the applying the DRX cycle time to a cellular network interface of the client device comprises:
    adjusting a radio interface layer (RIL) parameter of the cellular network interface.

7. A method comprising:
    collecting, by a push-to-talk (PTT) server, PTT usage data for a PTT client, the PTT usage data including information about calls made and received by the PTT client, wherein the collecting the PTT usage data for a PTT client comprises:
        determining whether a PTT usage level of the PTT client exceeds a predetermined threshold; and
        collecting the PTT usage data for the PTT client in response to the PTT usage level exceeding the predetermined threshold, wherein when the PTT usage level threshold is exceeded, the method further comprises:
    determining, by the PTT server, usage patterns according to the PTT usage data;
    creating, by the PTT server, a discontinuous reception (DRX) mode policy according to the usage patterns; and
    transmitting, by the PTT server, the DRX mode policy to the PTT client.

8. The method of claim 7, wherein the determining the usage patterns comprises:
    identifying, by the PTT server, the PTT usage data of the PTT client to be included in the determining the usage patterns;

collecting, by the PTT server, the PTT usage data of the PTT client in a window of time;
determining, by the PTT server, durations of DRX slots of the DRX mode policy according to the PTT usage data in the window of time; and
predicting, by the PTT server, the usage patterns for each of the DRX slots.

9. The method of claim 8, wherein the creating the DRX mode policy comprises:
creating, by the PTT server, the DRX mode policy based on the predicted usage patterns.

10. The method of claim 8, wherein predicting the usage patterns for the DRX slots comprises:
performing a time series analysis with the PTT usage data for each of the DRX slots.

11. The method of claim 7, further comprising:
serializing, by the PTT server, the DRX mode policy to a serialized document.

12. The method of claim 11, wherein the transmitting the DRX mode policy to the PTT client comprises:
transmitting, by the PTT server, the serialized document in a session initiation protocol (SIP) message to the PTT client.

13. The method of claim 7, wherein the DRX mode policy indicates, for each of the DRX slots, DRX cycle times the PTT client should use.

14. The method of claim 7, wherein the DRX mode policy indicates, for each of the DRX slots, whether the client should use a default DRX cycle time or a predetermined DRX cycle time.

15. A method comprising:
determining, by a push-to-talk (PTT) server, a selection criteria for VII clients accessing the PTT server, wherein the selection criteria indicates that PTT clients that located in a particular geographic area should be selected;
selecting, by the PTT server, a subset of the PTT clients that satisfy the selection criteria;
creating, by the PTT server, a discontinuous reception (DRX) mode policy for the subset of the PTT clients; and
transmitting, by the PTT server, the DRX mode policy to the subset of PTT clients.

16. The method of claim 15, wherein the selection criteria indicates which PTT clients should be selected.

17. The method of claim 15, further comprising:
serializing, by the PTT server, the DRX mode policy to a serialized document.

18. The method of claim 17, wherein the transmitting the DRX mode policy to the PTT clients comprises:
transmitting, by the PTT server, the serialized document in session initiation protocol (SIP) messages to the PTT clients.

19. The method of claim 15, wherein the DRX mode policy indicates a plurality of DRX slots, and further indicates, for each of the DRX slots, DRX cycle times the PTT clients should use.

20. The method of claim 15, wherein the DRX mode policy indicates a plurality of DRX slots, and further indicates, for each of the DRX slots, whether the PTT clients should use a default DRX cycle time or a predetermined DRX cycle time.

21. The method of claim 15, wherein the determining the selection criteria comprises:
determining a predetermined threshold for PTT usage level of the PTT clients.

22. A client device comprising:
a processor; and
a computer readable storage medium storing programming for execution by the processor, the programming including instructions for:
collecting, by a client device, PTT usage data for the client device, the PTT usage data including information about calls made and received by the client device;
determining usage patterns according to the PTT usage data;
creating a discontinuous reception (DRX) mode policy according to the usage patterns, wherein the mode policy is created in response to the PTT usage data indicating a recent call to a PTT group having a predefined attribute, wherein the predefined attribute is an indication that the PTT group is an emergency call group;
accessing the DRX mode policy, wherein the DRX mode policy is in accordance with push-to-talk (PTT) usage patterns;
selecting a DRX cycle time based on the DRX mode policy; and
applying the DRX cycle time to a cellular network interface of the client device.

23. A push-to-talk (PTT) server comprising:
a processor; and
a computer readable storage medium storing programming for execution by the processor, the programming including instructions for:
collecting PTT usage data for a PTT client, the PTT usage data including information about calls made and received by the PTT client, wherein the collecting the PTT usage data for a PTT client comprises instructions for:
determining whether a PTT usage level of the PTT client exceeds a predetermined threshold; and
collecting the PTT usage data for the PTT client in response to the PTT usage level exceeding the predetermined threshold, wherein when the PTT usage level threshold is exceeded, the programming further including instructions for:
determining usage patterns according to the PTT usage data;
creating a discontinuous reception (DRX) mode policy according to the usage patterns; and
transmitting the DRX mode policy to the PTT client.

24. A push-to-talk (PTT) server comprising:
a processor; and
a computer readable storage medium storing programming for execution by the processor, the programming including instructions for:
determining a selection criteria for PTT clients accessing the PTT server, wherein the selection criteria indicates that PTT clients that located in a particular geographic area should be selected;
selecting a subset of the PTT clients that satisfy the selection criteria;
creating a discontinuous reception (DRX) mode policy for the subset of the PTT clients; and
transmitting the DRX mode policy to the subset of PTT clients.

* * * * *